March 22, 1966  D. M. JACKSON  3,241,866
SWIVEL PIPE JOINT AND SEAL ASSEMBLY THEREFOR
Filed July 6, 1962
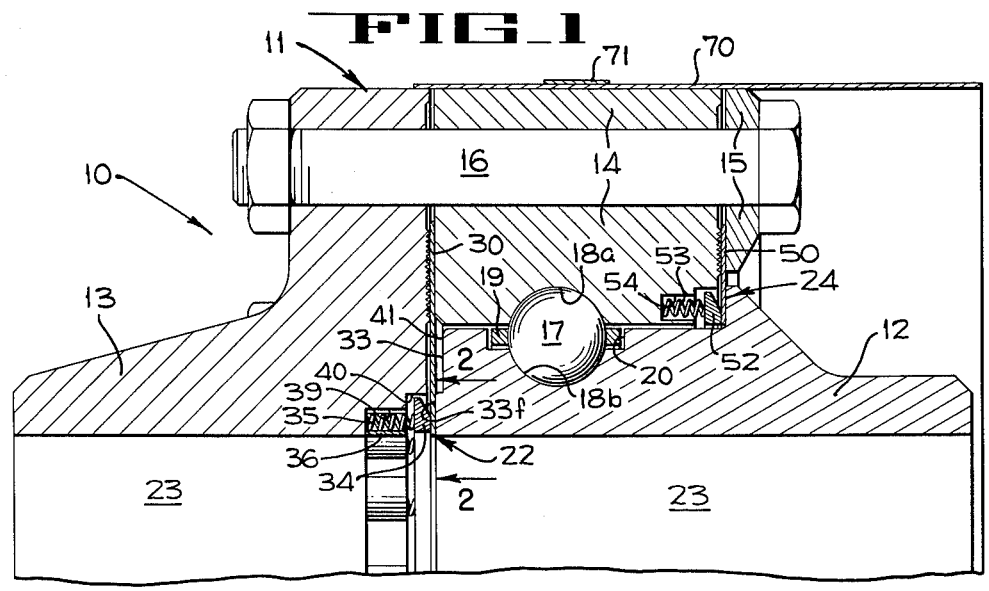
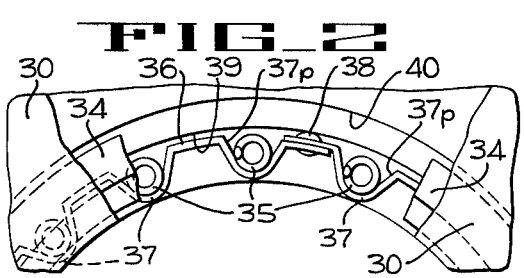
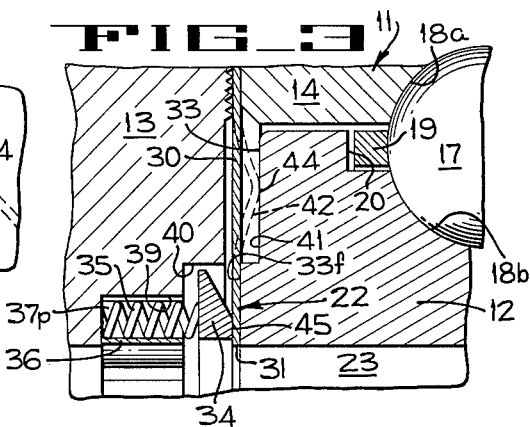
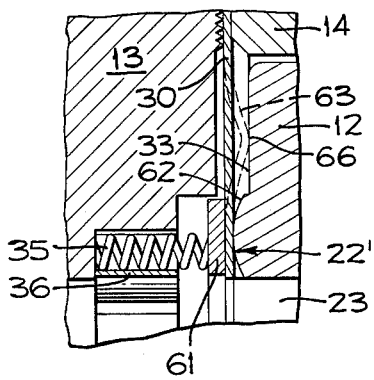
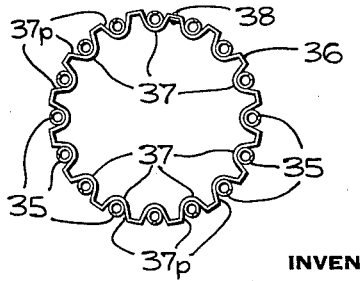
INVENTOR
DONALD M. JACKSON
BY Hans G. Hoffmeister
ATTORNEY United States Patent Office 3,241,866
Patented Mar. 22, 1966

3,241,866
SWIVEL PIPE JOINT AND SEAL
ASSEMBLY THEREFOR
Donald M. Jackson, Whittier, Calif., assignor to FMC
Corporation, San Jose, Calif., a corporation of Delaware
Filed July 6, 1962, Ser. No. 208,001
2 Claims. (Cl. 285—98)

The present invention pertains to swivel pipe joints and more particularly to a sealing assembly to effectively seal such swivel pipe joints handling cryogenic fluids.

Swivel pipe joints are in wide commercial usage today in a myriad of practical applications in the conveyance of fluid materials where both a rigid pipe structure is required and flexibility in the pipe line is essential. Sealing such pipe joints has presented many problems in the past because of the relative rotation between the two parts of the joint, and numerous sealing arrangements have been designed.

One type of seal which has found general commercial acceptance is the spring-urged disk or the "Discpak" (Registered Trademark of Chiksan Co.) sealing assembly such as is described in United States Patent No. 2,927,805 to Armand L. Faccou. This sealing assembly generally comprises a relatively thin flat ring or apertured disc clamped throughout its radially outer region within an outer tubular coupling member and whose radially inner region is adapted to seal against the end wall of an inner tubular coupling member. The radially inner region of the apertured disc is urged against the end wall of the inner coupling member by a backing ring energized by a plurality of springs arranged in a circular pattern. Such a sealing assembly, therefore, is pressure-actuated to maintain a dynamic, fluid tight seal between the relatively rotatable coupling members regardless of fluid pressure in the joint. Under high fluid pressures the sealing force is proportionately increased.

Within recent years there has been an increasing demand for swivel pipe joint structures and sealing assemblies which will effectively operate under very low temperature conditions. This has been in part due to the cryogenic fuels such as liquid oxygen which are used by missiles, rockets and other spacecraft. In the handling of such fuels during the loading and transfer operations, steel piping has been generally utilized due to its ability to withstand low temperatures without substantial decreases in strength. Since flexibility in the line is, of course, also a prime requisite in these operations, the desirability of a swivel pipe joint structure which includes a sealing assembly capable of efficiently functioning under such conditions was recognized.

It is therefore an object of the present invention to provide a swivel pipe joint having an improved spring-urged disc type of sealing assembly which will be especially effective when fluids at extremely low temperatures are passed through the joint, as in handling of cryogenic fluid for missiles and rockets.

Another object is the provision of a swivel pipe joint sealing assembly having a spring retainer which will hold a plurality of springs arranged in a circular pattern in position to exert a sealing force within the swivel pipe joint, the provision of which will substantially reduce the fabrication time and expense of the sealing assembly.

Another object is the provision of a sealing assembly including a foil sealing disk having a very thin coating of a fluoroethylene polymer thereon for sealing between relatively rotatable members and which is capable of resisting wear and maintaining its sealing qualities at very low temperatures.

Another object is the provision of a sealing assembly for a swivel pipe joint including an annular bearing surface of irregular shape so that a sealing member pressed into sealing relationship with the surface forms an especially effective annular seal when the swivel pipe joint is conducting liquid or gases under pressure.

Other objects and advantages of the invention will become apparent from the following description and the accompanying drawings in which:

FIGURE 1 is a section taken axially through a portion of a swivel pipe joint embodying the present invention.

FIGURE 2 is an enlarged, fragmentary, partly broken elevation, viewed as indicated by the line 2—2 of FIGURE 1.

FIGURE 3 is an enlarged section of the sealing assembly of the swivel joint of FIGURE 1.

FIGURE 4 is an elevation of the springs and the spring retainer element.

FIGURE 5 is a view similar to FIGURE 3, showing a modified form of sealing assembly.

Referring now more particularly to FIGURE 1 which discloses an embodiment of the present invention, the swivel joint 10 there illustrated comprises generally an outer tubular joint member 11 and an inner tubular joint member 12 which is rotatable therein. The outer tubular joint member 11 comprises a pipe connecting portion 13, a cylindrical socket member 14, and a ring 15, all of which are tightly secured together by means of a plurality of angularly spaced bolts 16. The inner and outer tubular members are connected together by antifriction balls 17 which are received in mating raceways 18a and 18b in the socket member 14 and the inner tubular member 12, respectively. In addition, an annular bearing cage 19 is provided to retain and space the balls about the joint structure in the raceways. A recess 20 is provided in the circumferential face of the inner tubular member 12 to receive the bearing cage. Both the inner tubular member 12 and the connecting portion 13 of the outer tubular member 11, which are assembled in immediately adjacent relationship, have substantially identical bores therethrough which are coaxially aligned to present a flow passage 23 through the joint.

As FIGURE 1 shows only a radial section of the swivel joint 10, it is to be understood that the joint is generally symmetrical about its longitudinal axis and that an axial section through the joint would expose two like sectional wall portions.

Two separate sealing assemblies 22 and 24 are provided at opposite ends of the socket member 14 to provide a two-way seal between the relatively rotataable portions of the swivel joint. The sealing assembly 22 seals the radial face, or inner end wall, of the inner tubular member 12, preventing the escape of liquid or gas from within the flow passage 23 through the ball and raceway structure which connects the tubular joint members. The sealing assembly 24 is located adjacent the end of the outer tubular member 11 and serves to prevent dust and other foreign material from entering the ball bearing connecting structure as well as serving as a secondary seal for the fluid within the flow passage.

Sealing assembly 22 is shown in detail in FIGURE 3. The assembly comprises a flat sealing ring, or annular disc 30, the radially outer portion of which is tightly clamped between the connecting member 13 and the socket member 14 by the bolts 16 to provide a gasket, or fluid tight static seal therebetween. The opening 31 defined by the inner circumference of the sealing ring 30 corresponds to and forms a portion of the flow passage 23 through the joint. In addition, the radially inner portion of the disc 30 abuts against the flat end face 33f of the inner tubular member 12 in sliding sealing relationship therewith. Urging the radially inner portion of the disc 30 against the face 33f is a pressure, or backing ring 34 which is forced against the disc by means of a plurality of springs 35 which are evenly spaced in a circular pattern around the flow passage 23. The construction of the sealing assembly 22 thus far described corresponds closely to that which is described in the aforesaid Faccou Patent No. 2,927,805.

In accordance with the present invention, the sealing disc 30 consists of thin metallic foil coated with a yieldable fluoroethylene polymer such as Teflon or Kel-F. The metallic quality of the disc is advantageous because it enables the disc to maintain its sealing efficiency at the extremely low temperatures at which the joints are operated during the handling of cryogenic fluids. The fluoroethylene coating provides a lubricous sealing surface on the disc which serves over a wide range of temperatures, including those in the cryogenic range, to minimize the resistance to rotation developed at the seal. The backing ring 34, which is used to press the sealing disc 30 against the face 33f, is also of metal, preferably hardened, in order to withstand the low temperatures to which the joint may be subjected.

An important feature of the invention is the spring retaining cage member 36 which is used to space the springs 35 that urge the backing ring 34 against the sealing disc. As best seen in FIGURES 2 and 4, this spring cage 36 comprises a thin annular metallic strip having a series of uniformly spaced corrugations 37, each of which defines a pocket 37p loosely containing one of the springs 35. In forming this spring cage a straight strip of resilient metal stock is utilized. The corrugations 37 are stamped therein, and then the strip is bent into the shape of an annulus whose inner diameter corresponds to the diameter of the flow passage 23, the ends of the strip being riveted together as at 38. The springs and spring cage are then placed in a counterbore 39 which opens into a larger counterbore 40 within which the backing ring 34 is floatingly mounted.

As shown in FIGURE 3, the inner end face 33 of the inner tubular member 12 is recessed at 41 so that the sealing disc 30 contacts the end wall of the tubular member only along the relatively narrow radial face 33f of an annular shoulder protruding from the radially inner portion of the end face 33. This radial face 33f is substantially in coplanar alignment with the end of the socket member 14 against which the radially outer region of the sealing disc is squeezed with the result that no deformation of the disc from its naturally flat condition is required to effect engagement of the disc's radially inner region with the annular, radial face 33f. When the swivel joint is subjected to fluid pressure, the disc 30 deforms into the broken line position 42 of FIGURE 3. In this position, a secondary seal 44 is formed in the recess 41. The annular seal 44 is substantially a line seal and is particularly effective to seal against any fluid which may escape past the shoulder because the fluid pressure is exerted against the relatively large area of the deformed part of the disc, while the resultant mechanical pressure exerted by the deformed part of the disc is concentrated at the much smaller area of the line seal 44.

The combined structure of the seal assembly 22 operates in the following manner: Primary sealing action, of course, takes place on the face 33f of the annular shoulder. This has a rather large annular sealing area so that under normal conditions the wear on the sealing disc 30 and particularly on the fluoroethylene polymer coating will not be severe. However, should fluid escape past the face 33f during very high pressure periods within the joint, the seal 44 will take effect due to the deformed condition of the disc 30 at this time. This secondary seal 44 concentrates a large force over a narrow annular area to thereby provide a higher unit pressure seal and enhance the over-all effectiveness of the sealing assembly. At low fluid pressures, where the sealing disc 30 does not undergo substantial deformation, the spring-urged ring 34 serves to maintain adequate pressure of the disc against the sealing face 33f. It should also be noted that this seal is enhanced by the shape of ring 34 which concentrates its pressure over a narrow radially inner area 45 of the annular face 33f.

Sealing assembly 24 is similar to the assembly 22 in that it is composed of an annular sealing disc 50 which is urged into sealing engagement with a portion of the inner tubular member 12 by means of a backing ring 52 and a plurality of springs 53. Each of the springs 53 is received within a hole 54 bored in the end face of the sprocket member 14. If desired, however, an annular spring cage member similar to the member 36 could be provided to retain the springs 53, thus eliminating the necessity for forming the holes 54. The radially outer part of the sealing disc 50 is tightly clamped between the ring 15 and the socket 14 by means of the bolts 16. It is also of the flattened toroidal shape similar to the disc 30; however, no exceptional deformation is permitted in this member nor is it required since the seal 50 merely serves as an auxiliary seal for the seal 30. Its main purpose is to prevent the entry of dust and other foreign material into the swivel joint, and, therefore, the force of the backing ring 52 against the radially inner part of the disc 50 provides the requisite sealing force.

FIGURE 5 illustrates a modification 22' of the sealing assembly 22. In this embodiment the backing ring 34 has been replaced by a flat ring 61 which engages the radially innerpart of the disc 30 over the entire wide annular face of the ring 61. The sealing face 33f on the inner tubular member 12 has been replaced by a rounding sealing surface 62 against which the sealing disc is pressed. The advantage of such a structure over that shown in FIGURE 3 is that a higher pressure per unit area is achieved over the primary sealing surface. This is because there is essentially line contact between the crest of the rounded primary sealing surface 62 and the sealing disc 30. While such structure achieves a highly effective primary seal, it also has the disadvantage of wearing more rapidly than the substantially flat-faced seal of FIGURE 3. Therefore, the embodiments of FIGURE 3 or FIGURE 5 may be alternatively used, depending upon whether long life or minimum leakage is the more desired quality of the swivel joint seal structure. The disc 30 is also adapted to deform to the position 63 indicated by the broken lines of FIGURE 5 under high pressures within the flow passage. This provides a secondary annular seal 66 between the relatively rotatable portions of the joint similar to that achieved in the embodiment of FIGURE 3.

A further feature of the instant swivel joint, is the provision of a rain and moisture shield 70 which is secured to the exterior portion of the outer tubular member 11 by means of a strap 71 which is suitably tightened in a manner not shown. The shield 70 serves a protective function in keeping rain or spray away from the connection between the relatively rotatable portions of the joint. It can be appreciated that under the extremely low temperature conditions at which the swivel joint is designed to operate, any rain or moisture which may work its way between the relatively rotatable members 11 and 12 will have a tendency to freeze and greatly hamper the free swiveling movement of the joint.

From the foregoing description, it is apparent that the structure of the present invention presents an improved sealing assembly which is especially adapted for operation at low temperatures, as in the handling of cryogenic fuels or the like. In addition, an improved and more easily fabricated structure is provided for a spring-urged, pressure-actuated sealing assembly.

While two embodiments of the present invention have been shown and described, it will be understood that further changes and modifications may be made therein without departing from the spirit of the invention or the scope of the appended claims.

The invention having thus been described what is believed to be new and is desired to be protected by Letters Patent is:

1. A fluid conducting swivel joint comprising an outer joint member including two tubular sections, means releasably and rigidly securing the sections in coaxial relation, an inner tubular member mounted within one of said tubular sections and having a fluid conducting bore therein, and an abutment surface on the inner end thereof, said abutment surface being substantially coplanar with the end surface of said one of the tubular sections, said tubular member further having a recess spaced radially outward from said abutment surface at said inner end, the other of the tubular sections having an annular recess therein facing said abutment surface on the inner tubular member and opening into the bore of said other tubular section, a seal actuating pressure ring in said recess, a plurality of spaced springs in the recess behind the seal actuating ring and forcing the ring toward said abutment surface of the inner tubular member when the tubular sections are in assembled relation, a corrugated annular sheet member in said recess, said springs being received within outwardly facing corrugations of said sheet member, and a deformable foil sealing means having a thin coating of a yieldable plastic material mounted between the tubular sections with its outer periphery clamped between said tubular sections in sealing relation therewith for forming a primary seal with said abutment surface and a secondary seal within said recess with said inner tubular member, the inner portion of the sealing means being forced by said ring and said springs against the abutment surface of the tubular member in sliding sealing engagement therewith to form said primary seal with the tubular member, said sealing means being deformed under high fluid pressure within said bore to form within the recess said secondary annular seal with said tubular member.

2. The joint according to claim 1, wherein said abutment surface is curved and has a crest in engagement with said sealing means and wherein said pressure ring is provided with a flat planar surface urging the sealing means toward said crest.

References Cited by the Examiner

UNITED STATES PATENTS

| | | | |
|---|---|---|---|
| 1,012,398 | 12/1911 | McCombie | 285—98 |
| 1,326,970 | 1/1920 | Row | 285—334.4 X |
| 1,535,219 | 4/1925 | Fulton | 285—98 |
| 2,008,580 | 7/1935 | Dennison | 277—88 X |
| 2,014,355 | 9/1935 | Hussman | 285—45 |
| 2,276,221 | 3/1942 | Magnesen | 277—90 X |
| 2,374,353 | 4/1945 | Jacobsen | 277—87 |
| 2,383,667 | 8/1945 | Matter | 277—86 |
| 2,383,862 | 8/1945 | Hornschurch | 277—91 |
| 2,448,646 | 9/1948 | Wisniewski | 277—88 X |
| 2,903,278 | 9/1959 | Wormser | 285—110 X |
| 2,927,805 | 3/1960 | Faccou | 285—276 X |
| 2,964,340 | 12/1960 | Kinzie | 285—276 X |
| 3,027,165 | 3/1962 | Kempff | 277—88 X |

FOREIGN PATENTS

| | | |
|---|---|---|
| 144,296 | 11/1951 | Australia. |
| 520,377 | 4/1940 | Great Britain. |
| 716,409 | 10/1054 | Great Britain. |
| 898,244 | 6/1962 | Great Britain. |

CARL W. TOMLIN, *Primary Examiner.*